(12) United States Patent
Williamson et al.

(10) Patent No.: US 6,785,417 B1
(45) Date of Patent: Aug. 31, 2004

(54) METHOD AND SYSTEM FOR SEARCHING FOR WORDS IN INK WORD DOCUMENTS

(76) Inventors: Peter H. Williamson, 13208 NE. 129th Pl., Kirkland, WA (US) 98034; Charlton E. Lui, 6215 204th Dr. NE., Redmond, WA (US) 98053

( * ) Notice: Subject to any disclaimer, the term of this patent is extended or adjusted under 35 U.S.C. 154(b) by 396 days.

(21) Appl. No.: 09/643,617

(22) Filed: Aug. 22, 2000

(51) Int. Cl.[7] .............................. G06K 9/68; G06K 9/72
(52) U.S. Cl. ........................ 382/186; 382/187; 382/218; 382/228; 382/229
(58) Field of Search ................................ 382/186, 187, 382/188, 189, 229, 217, 218, 228; 707/3, 4, 6

(56) References Cited

U.S. PATENT DOCUMENTS

| | | | |
|---|---|---|---|
| 5,594,640 A | | 1/1997 | Capps et al. |
| 5,615,285 A | | 3/1997 | Beernink |
| 5,675,665 A | | 10/1997 | Lyon |
| 5,682,439 A | | 10/1997 | Beernick et al. |
| 5,710,916 A | | 1/1998 | Barbara et al. |
| 5,764,799 A | * | 6/1998 | Hong et al. .................. 382/225 |
| 5,812,697 A | | 9/1998 | Sakai et al. |
| 5,828,991 A | | 10/1998 | Skiena et al. |
| 5,855,000 A | | 12/1998 | Waibel et al. |
| 5,857,099 A | | 1/1999 | Mitchell et al. |
| 5,953,451 A | * | 9/1999 | Syeda-Mahmood ......... 382/187 |
| 5,960,447 A | | 9/1999 | Holt et al. |
| 5,995,664 A | | 11/1999 | Shimomura |
| 6,005,973 A | | 12/1999 | Seybold et al. |
| 6,014,460 A | * | 1/2000 | Fukushima et al. ......... 382/177 |
| 6,041,141 A | * | 3/2000 | Yamamoto et al. ......... 382/231 |
| 6,111,985 A | | 8/2000 | Hullender et al. |
| 6,473,517 B1 | | 10/2002 | Tyan et al. |
| 6,493,464 B1 | | 12/2002 | Hawkins et al. |
| 2002/0013795 A1 | | 1/2002 | Dresevie et al. |
| 2002/0049796 A1 | | 4/2002 | Dresevie et al. |

FOREIGN PATENT DOCUMENTS

JP   07110845 A  *  4/1995  ............ G06K/9/72

OTHER PUBLICATIONS

Senda et al. "Document Image Retrieval System Using Character Candidates Generated by Character Recognition Process." Proc. of the $2^{nd}$ Int. Conf. on Document Analysis and Recognition, Oct. 20, 1993, pp. 541–546.*

Liang et al. "Efficient Algorithms for Segmentation and Recognition of Printed Characters in Document Processing." IEEE Pacific Rim Conf. on Communications, Computers and Signal Processing, vol. 1, May 19, 1993, pp. 240–243.

(List continued on next page.)

*Primary Examiner*—Jon Chang
(74) *Attorney, Agent, or Firm*—Law Offices of Albert S Michalik, PLLC

(57) ABSTRACT

In a computing device that receives handwritten data, a method and system for finding matches for recognized handwritten words, by comparing a given search word (and possibly its alternates) with the words in a document, including recognized ink words and any possible alternates for those recognized words as returned by a recognizer. One described test looks for an exact match between an entered search word (and possibly its alternates) and the recognized words and their alternates stored in a handwritten document. Other tests are possible because of the use of alternates, which also may be returned with a probability ranking. For example, one scheme looks for a percentage of matching characters, with a user-determined threshold percentage. Other variations include giving different weight to certain characters, and/or factoring in the relative number of syllables and/or the relative lengths of the words. The probabilities of alternates may be used as a factor in the determination, and other factors and possible tests are described.

48 Claims, 8 Drawing Sheets

OTHER PUBLICATIONS

Lee et al. "A New Methodology for Gray–Scale Character Segmentation and Recognition." Proc. Of the 3$^{rd}$ Int. Conf. on Document Analysis and Recognition, vol. 1, Aug. 14, 1995, pp. 524–527.

Ariki et al. "Segmentation and Recognition of Handwritten Characters Using Subspace Method." Proc. Of the 3$^{rd}$ Int. Conf. on Document Analysis and Recognition, vol. 1, Aug. 14, 1995, pp. 120–123.

Zhao et al. "New Method for Segmenting Unconstrained Handwritten Numeral String." Proc. Of the 4$^{th}$ Int. Conf on Document Analysis and Recognition, vol. 2, Aug. 18, 1997, pp. 524–527.

Carrano. Data Abstraction and Problem Solving with C++; Walls and Mirrors. The Benjamin/Cummings Publishing Company, Inc,. 1995, pp. 150–163, 175–176, 179–180.

Morita et al. "A Fast and Compact Data Structure of Storing Multi–Attribute Relations Among Words." IEEE In Conf. on Systems, Man and Cybernetics, vol. 3, Oct. 11, 1998, pp. 2791–2796.

Arica et al. "A New Scheme for Off–Line Handwritten Connected Digit Recognition." Proc. KES '98, 2$^{nd}$ Int. Conf. on Knowledge–Based Intelligent Electronic Systems, vol. 2, Apr. 21, 1998, pp. 329–335.

Jung et al. Machine Printed Character Segmentation Method Using Side Profiles. Proc. SMC '99, IEE Int. Conf. on Systems, Man, and Cybernetics, vol. 6, Oct. 12, 1999, pp. 863–867.

* cited by examiner

METHOD AND SYSTEM FOR SEARCHING FOR WORDS IN INK WORD DOCUMENTS

FIELD OF THE INVENTION

The present invention relates generally to computer devices, and more particularly computer devices arranged to receive handwritten input.

BACKGROUND OF THE INVENTION

Contemporary computing devices allow users to enter handwritten words (e.g., in cursive handwriting and/or printed handwritten characters) and symbols (e.g., a character in Far East languages). The words and symbols can be used as is, e.g., to function as readable notes and so forth, or can be converted to text for more conventional computer uses. To convert to text, for example, as a user writes strokes representing words or other symbols onto a touch-sensitive computer screen or the like, a handwriting recognizer (e.g., trained with millions of samples, employing a dictionary, context and other rules) is able to convert the handwriting data into dictionary words or symbols. In this manner, users are able to enter textual data without necessarily needing a keyboard.

When dealing with typewritten input entered into a word processing program, it is relatively straightforward to implement a "find" or "search" feature as part of the program. With text, a user types in a search string and possibly enters some properties of the string, (e.g., bold typeface), and the program searches for a string in a document that exactly matches the word and any specified properties. Such a search is straightforward because typewritten input entered into a word processing program is defined by a limited set of codes, e.g., ASCII numeric values represent alphanumeric characters, and there is a limited set of properties a string can have. In general, the word processing program simply advances through the document attempting to match the full set of entered codes of the search string with a string of codes in a document in order to find an exact (allowing for any wildcards) match.

However, when entering handwritten ink, e.g., via an electronic ink processing program, it is virtually impossible for a user to write a word exactly the same way twice. Thus, searching is not possible via the simple "exact-string-match-or-not" operation. One attempted search method featurizes the electronic ink (e.g., handwritten data in the form of coordinates and other information) entered by a user, and searches through the document to find another piece of ink with similar features. This method is not very reliable, as for example, the same user can write two sets of ink, each of which is intended to be the same word, but that significantly vary from each other's features from the computer's perspective. A second method uses simple string comparison, using the translated text word that appears for any handwritten input. This second method is also relatively unreliable, because such a search depends on a recognizer making a correct translation for each translated word, despite the reality that recognizers are not one hundred percent accurate.

SUMMARY OF THE INVENTION

Briefly, the present invention provides a system and method for finding matches for recognized handwritten words, by comparing a given search word (a typed-in character set or handwritten word that has been recognized) against the words in a document, including recognized words and any possible alternates for those recognized words as returned by a recognizer. For handwritten (ink) words, one implementation may look for an exact match between an entered search word (and possibly alternates of the search word) and the recognized words and their alternates stored in a handwritten document. To this end, the recognized word and each alternate associated therewith are examined against an entered search word and possibly its alternates.

Numerous other variations are possible because of the use of alternates, which also may be returned with a probability ranking. For example, rather than a strict exact match test on the alternates, a scheme that looks for a percentage of matching characters can be implemented, with the user optionally adjusting the percentage, e.g., from loose to exact. Other variations include the weighting of certain characters, (e.g., the first character has to exactly match, with only a percentage of others needed), and/or factoring in the number of syllables. Since alternates are returned with a probability, the probabilities of alternates may be used, e.g., a looser match is adequate on a highly probable word, while an exact match is required on a less probable word. Other variations include length of word weighting, Bayesian combination of probabilities to determine weighting, alternate to alternate exact match, percentage of alternate to alternate matches, the percentage of the percentages and so on, and the use of word/alternate matching in conjunction with ink/feature/bitmap/image matching. Various combinations of these variations are also feasible.

Other advantages will become apparent from the following detailed description when taken in conjunction with the drawings, in which:

DETAILED DESCRIPTION

Exemplary Operating Environment

Figure 1:
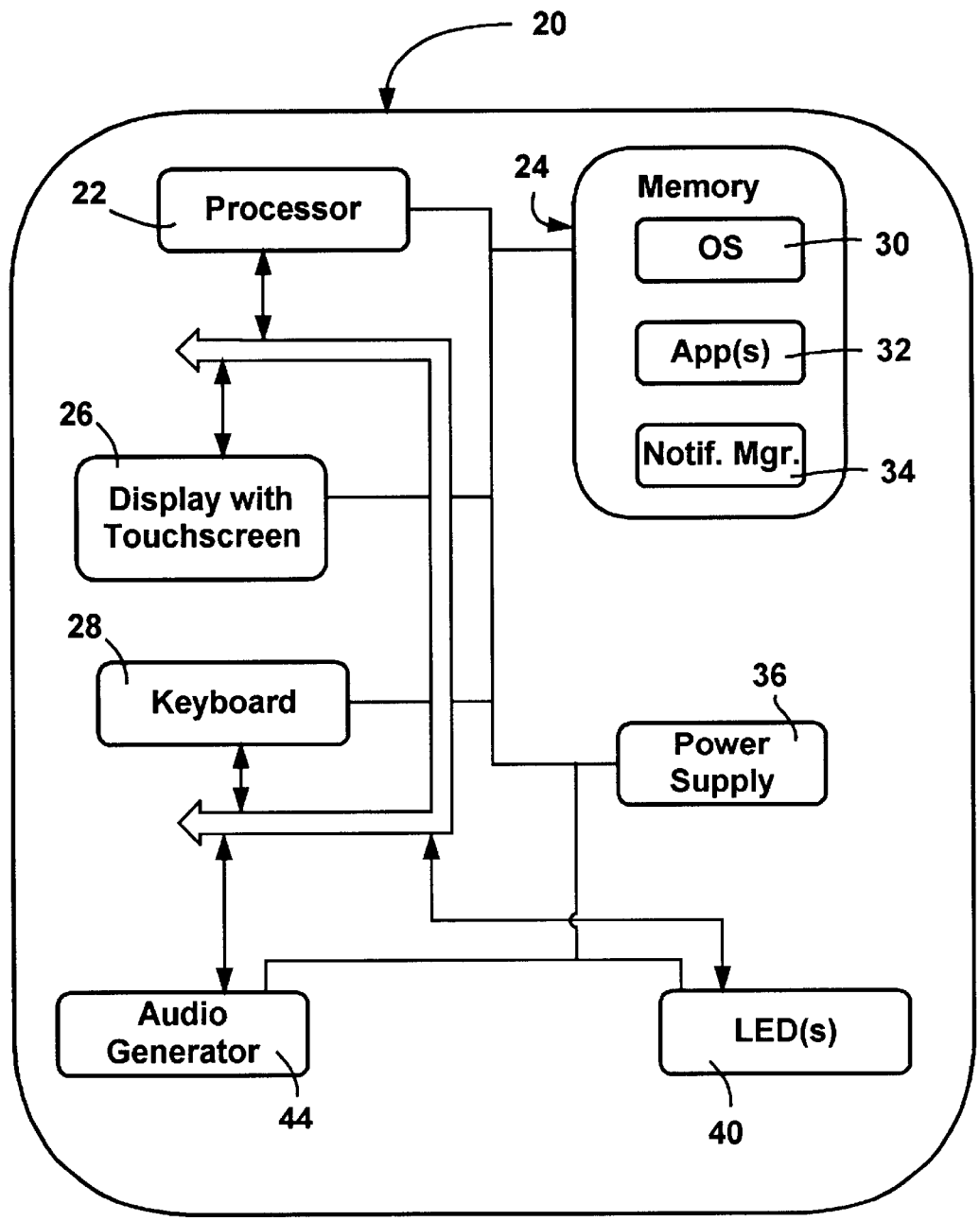
FIG. 1 is a block diagram representing one exemplary computer system into which the present invention may be incorporated.

FIG. 1 illustrates an example of a suitable operating environment 20 in which the invention may be implemented. The operating environment 20 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include routines, programs, objects, components, data structures and so forth that perform particular tasks or implement particular abstract data types. Typically the functionality of the program modules may be combined or distributed as desired in various embodiments.

Computing device 20 typically includes at least some form of computer readable media. Computer-readable media can be any available media that can be accessed by the computing device 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

FIG. 1 shows functional components of one such handheld computing device 20, including a processor 22, a memory 24, a display 26, and a keyboard 28 (which may be a physical or virtual keyboard). The memory 24 generally includes both volatile memory (e.g., RAM) and non-volatile memory (e.g., ROM, PCMCIA cards, and so forth). An operating system 30 is resident in the memory 24 and executes on the processor 22. The handheld personal computer 20 includes an operating system, such as the Windows® CE operating system from Microsoft® Corporation or other operating system.

One or more application programs 32 are loaded into memory 24 and run on the operating system 30. Examples of applications include email programs, scheduling programs, PIM (personal information management) programs, word processing programs, spreadsheet programs, Internet browser programs, and so forth. The handheld personal computer 20 may also include a notification manager 34 loaded in the memory 24, which executes on the processor 22. The notification manager 34 handles notification requests, e.g., from the application programs 32.

The handheld personal computer 20 has a power supply 36, which is implemented as one or more batteries. The power supply 36 may further include an external power source that overrides or recharges the built-in batteries, such as an AC adapter or a powered docking cradle.

The exemplary handheld personal computer 20 represented in FIG. 1 is shown with three types of external notification mechanisms: one or more light emitting diodes (LEDs) 40 and an audio generator 44. These devices may be directly coupled to the power supply 36 so that when activated, they remain on for a duration dictated by a notification mechanism even though the handheld personal computer processor 22 and other components might shut down to conserve battery power. The LED 40 preferably remains on indefinitely until the user takes action. Note that contemporary versions of the audio generator 44 use too much power for today's handheld personal computer batteries, and so it is configured to turn off when the rest of the system does or at some finite duration after activation.

Ink Word Searching

Figure 2:
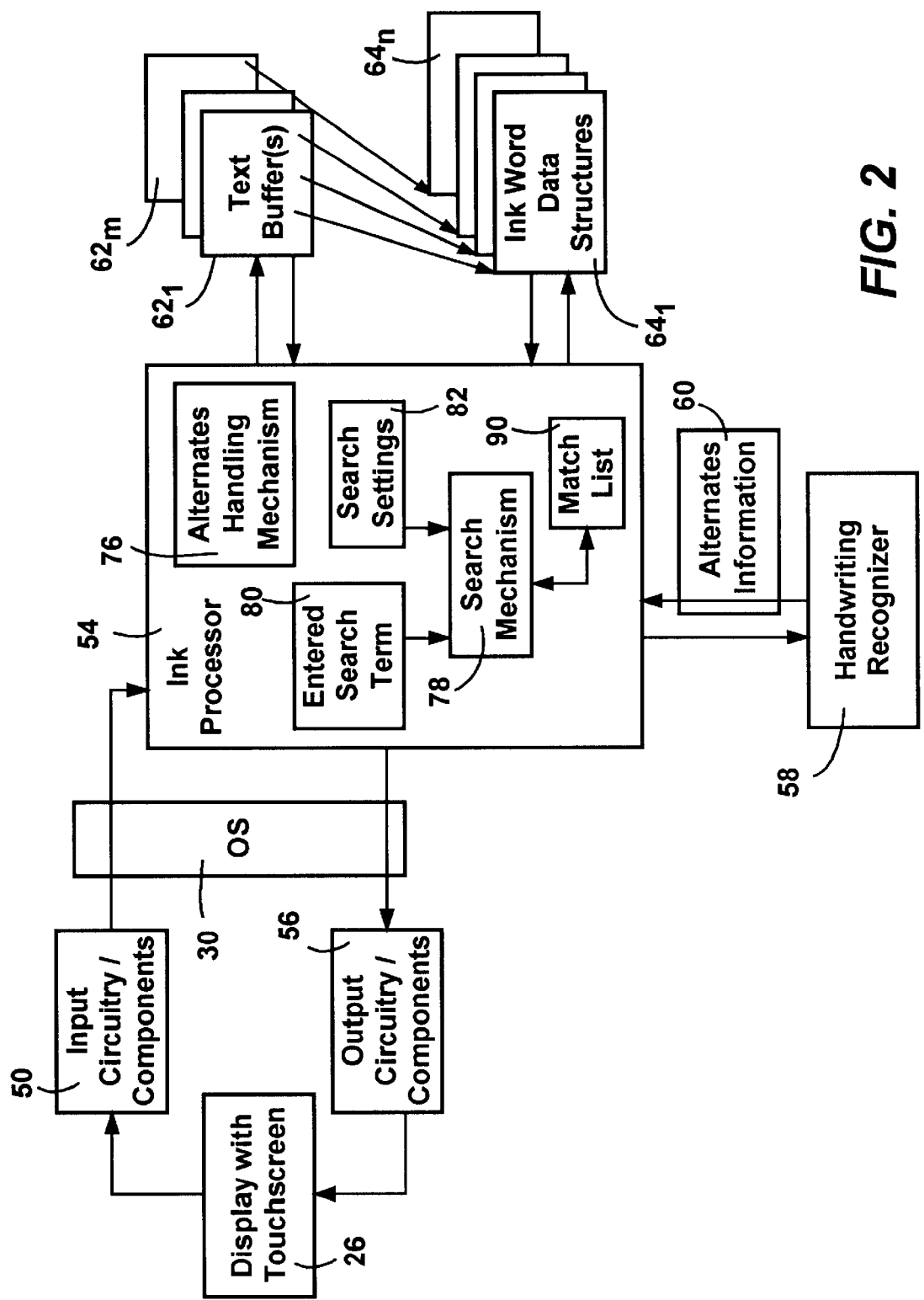
FIG. 2 is a block diagram generally representing components and data structures for handling electronic ink handwritten into a computer system and capable of implementing the present invention.

FIG. 2 represents general components and data structures of the computing system 20 when configured for handwriting recognition and ink word searching in accordance with one aspect of the present invention. In FIG. 2, as a user enters data such as by typing or by handwriting data on the touch screen display 26, input circuitry and/or other components 50 pass the information to the operating system 30. Depending on the state of the system and/or where the screen is contacted, the user input may be converted to text by the operating system or treated as handwritten data. For example, when the screen has a representation of a keyboard displayed thereon and that keyboard is touched, the coordinates may be converted to an ASCII or Unicode character, or an editing command, and sent to an appropriate component (e.g. word processor) to use. Alternatively, if the user is writing in a handwriting input area, the input circuitry 50/operating system 32 passes the data to an ink processor component 54 to process and otherwise handle the electronic ink data. Note that a user may enter the handwritten data (electronic ink) in another manner, such as via a tablet connected to a personal computer.

As is understood, the handwritten data may be in the form of coordinates, and may include other information, e.g., pressure data, timing data and so forth. The ink processor component 54 may comprise an application program, or alternatively may be a subcomponent of or integrated into the operating system 30. The ink processor 54 may also be arranged to pass characters, (e.g., Unicode), whether typed or recognized from words or symbols, to conventional applications that can only deal with characters. For purposes of the present description, the ink processing component 54 will also perform the operations of a conventional word processor, e.g., handle both recognized text and unrecognized ink, allow the editing of words, both text words and handwritten words, update the display 26 (e.g., to word-wrap, mark or insert text or words, delete words) as appropriate, and so forth.

After some pre-processing, such as described in related copending U.S. patent application entitled: "Method and System of Matching Ink Processor and Recognizer Word Breaks," U.S. patent application Ser. No. 09/643,417 filed concurrently herewith and hereby incorporated by reference, the ink processor 54 passes ink data (e.g., one line as entered by a user) corresponding to words or symbols to recognizer 58 for recognition thereof. The ink processor 54 may also provide ink feature information. Depending on factors such as the system's processing speed and processor/memory availability and so forth, and/or a user's explicit request for recognition, the data passing and/or recognition may take place in the background or foreground, as appropriate. In keeping with the present invention as described below, the recognizer 58 returns alternates information 60 corresponding to recognized word or words for the ink passed thereto. In general, the alternates information 60 comprises a list of alternate word choices, or simply alternates (sometimes referred to as candidates), for each word recognized by the recognizer 58 for a given set of handwriting data passed thereto. The alternates may be ranked in accordance with probability of correctness, and/or probability information associated with each alternate may be returned in the alternates information 60. For example, a list of alternates may be returned with a highest ranked alternate having a sixty percent probability, the next ranked alternate with a ten percent probability, and so on. The number of returned alternates may be limited to some fixed amount, and/or alternates with very low probabilities may be left off the list. Note that the probability information may be returned on a logarithmic scale instead of in terms of a percentage value. One suitable recognizer is described in U.S. Pat. Nos. 5,313,527 and 5,467,407, hereby incorporated by reference. However, as will be understood, the present invention will operate with any type of recognizer that returns alternates, including a speech recognizer.

As generally represented in FIG. 2, the ink processor 54 maintains one or more text buffers $62_1$–$62_m$. Each text buffer (e.g. $62_1$) is a data structure storing some or all of the contents of a document, such as individual letters, spaces, inked words, and drawings. For example, a text buffer can store the entire contents of a document, or each of a plurality of text buffers can represent one paragraph in a document.

To indicate an inked word, the text buffer (e.g., $62_1$) also contains special codes that indicate the locations of ink words $64_1$–$64_n$ relative to text and other items in the text buffer $62_1$. Each such code is directly followed by a pointer (shown in FIG. 2 via the slanted lines from the text buffers) to the ink word data structure (sometimes referred to as a scrawl) that contains the ink data for that word.

Figure 3:
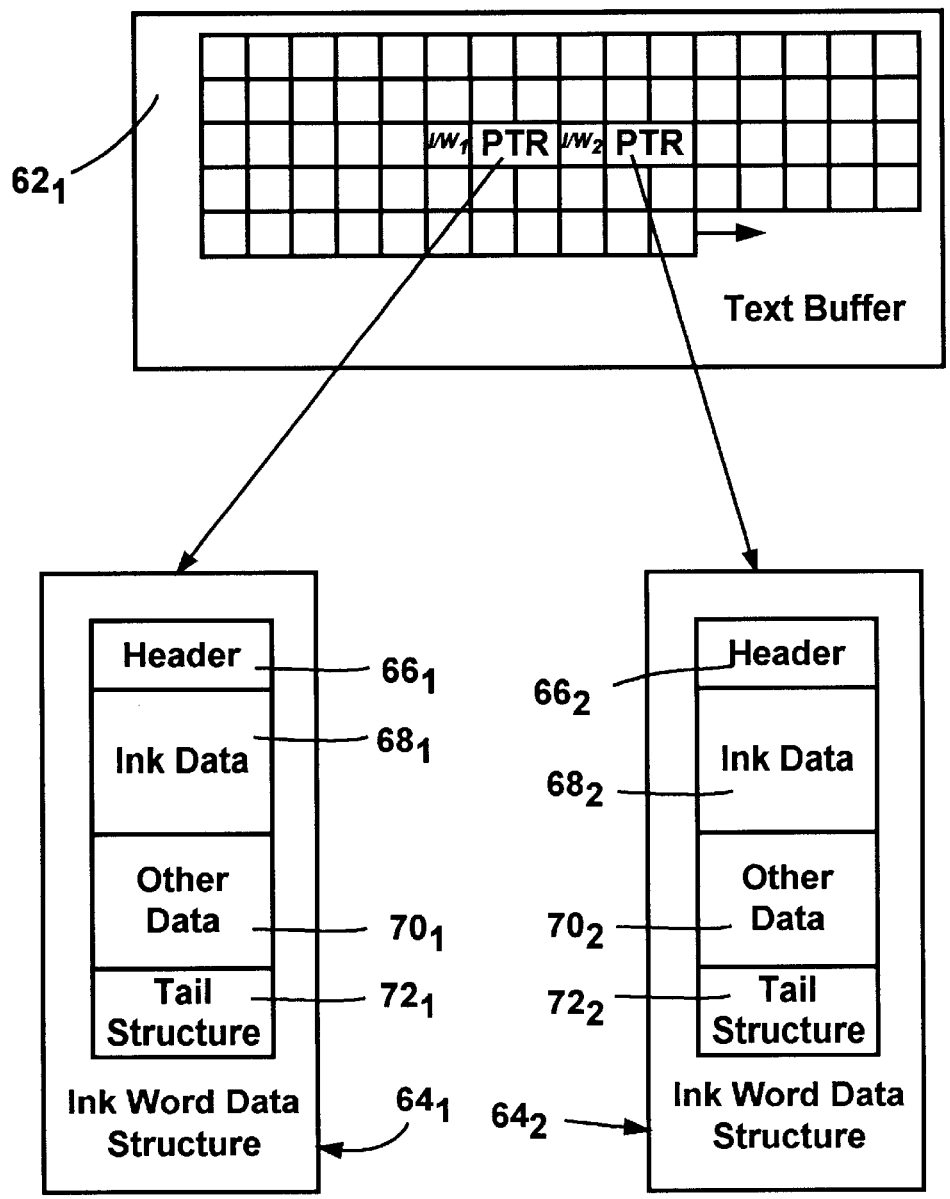
FIG. 3 is a representation of how handwritten data and text data is generally maintained by the ink processor.
Figure 4:
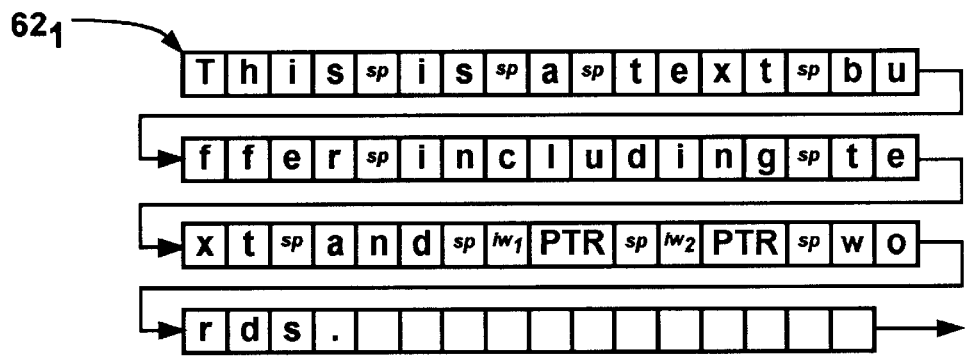
FIG. 4 is a representation of the contents of an example text buffer and how it is displayed to a user.

By way of example, FIG. 3 represents a text buffer (e.g., $62_1$) with memory (e.g., bytes) for text, possibly other items, and special ink word codes ($IW_1$ and $IW_2$), each code followed by its respective pointer to ink words $64_1$–$64_2$. As shown in FIG. 3, the pointers are two bytes in length, but of course pointers of other sizes are feasible. Also, only two ink words are shown, and are consecutive in the text buffer, however any number of ink words may be placed anywhere in a document/text buffer. FIG. 4 shows how the text buffer $62_1$ (shown in FIG. 4 as a linear array) and its ink word data structures $64_1$–$64_2$ may be interpreted by the ink processor to result in a particular display, having been converted to their text form.

As generally represented in FIG. 3, each ink word, such as the ink word $64_1$, comprises a data structure having a header 66 which describes the ink data section 68 following it. One of the things tracked in the header 66 is whether an ink word has alternates (i.e., the ink was sent to the recognizer with the alternates information returned therefore) in a Recognized (tsRecognized) flag.

In addition to the header field 66 and ink data field 68, other fields are possible, such as an other data field 70 followed by a tail structure field 72 that describes the other field 70. For example, the other field may include the alternates and probability information associated with those alternates as returned by the recognizer 58 following recognition. As described below, the tail structure field 72 describes this other field 70. The maintenance and use of the alternates, and the tail structure, are described below and further described in related copending U.S. patent applications: Ser. No. 09/644,022 entitled "Method and System for Handling the Selection of Alternates for Recognized Words"; Ser. No. 09/643,414 entitled "Method and System for Maintaining Alternates in Association with Recognized Words" and Ser. No. 09/643,997 entitled "Method and System for Extending Ink Word Data Structures while Maintaining Version Compatibility" filed concurrently herewith and hereby incorporated by reference.

The following table sets forth an ink word data structure (scrawl) including the tail structure, (also described below with reference to FIG. 6):

```
// The Ink Word Structure
typedef struct TXT_SCRAWL
{
    U8              flags;
    U8              candidateChoice;    //index of chosen candidate
                                        //zero based
    INK_STYLE       inkStyle;
    COORD16         width;
    U16             strokeCount;
    U16             bufferSize;
    U8              buffer[2]; //padded for alignment
    // first comes the array of strokes
    //then comes a double null terminated list of strings
    //at the very end is a TXT_SCRAWL_TAIL struct
} TXT_SCRAWL, FAR * P_TEXT_SCRAWL;
// this buffer is appended onto the scrawl to optimize
// getting to strings. For compatibility reasons, it grows
// from the beginning, not the end of the tail structure,
// since a negative addressing scheme from the text scrawl
// end is used to get to its members
typedef struct TXT_SCRAWL_TAIL
{
    U32             tailStructVersion;   //starts at 1 and grows
                                         //upwards;
    U32             stringAreaOffset;    //offset from beginning
                                         //of TXT_SCRAWL to the
                                         //start of the double
                                         //null terminated string
                                         //list.
    U32             chosenStringOffset;  //offset from beginning
                                         //of TXT_SCRAWL to the
                                         //chosen string.
    U16             wchFirstXlateChar;   //first char of the
                                         //chosen string.
// ADD ANY NEW MEMBERS AT THE END
} TXT_SCRAWL_TAIL * P_TEXT_SCRAWL_TAIL;
```

For purposes of simplicity herein, the present invention will primarily be described with respect to handwritten cursive words, using the English language for various examples. However, as will be understood, the present invention may operate with printed characters and symbols, and provides numerous benefits regardless of any particular language.

One of the operations performed by the ink word processor 54 is to manage the alternates returned by the recognizer 58. To this end, as generally represented in FIG. 2, the ink processor 54 includes code that serves as an alternates handling mechanism 76. In one preferred embodiment, following recognition of a word, the alternates handling mechanism 76 maintains the alternates data in an ink word data structure (e.g., $64_1$) of the text buffer e.g., $62_1$, such as in the other field $70_1$ as described by the tail structure field $72_1$. Once a word has been converted to text or had an alternate selected for it, the ink word data structure is displayed as the first letter of the selected alternate, with any remaining letters being inserted as text into the text buffer.

Figure 5:
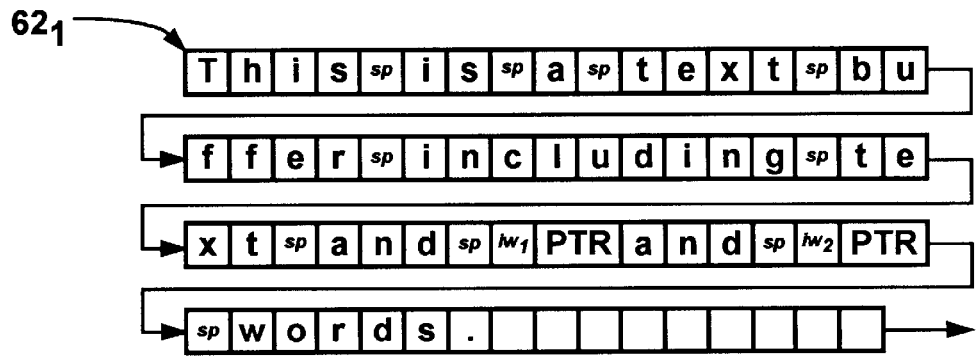
FIG. 5 is a representation of the contents of the example text buffer of FIG. 4 as modified once alternates have been returned for an ink word.
Figure 5:
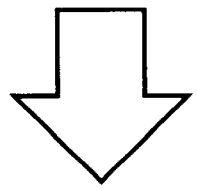
Figure 5:
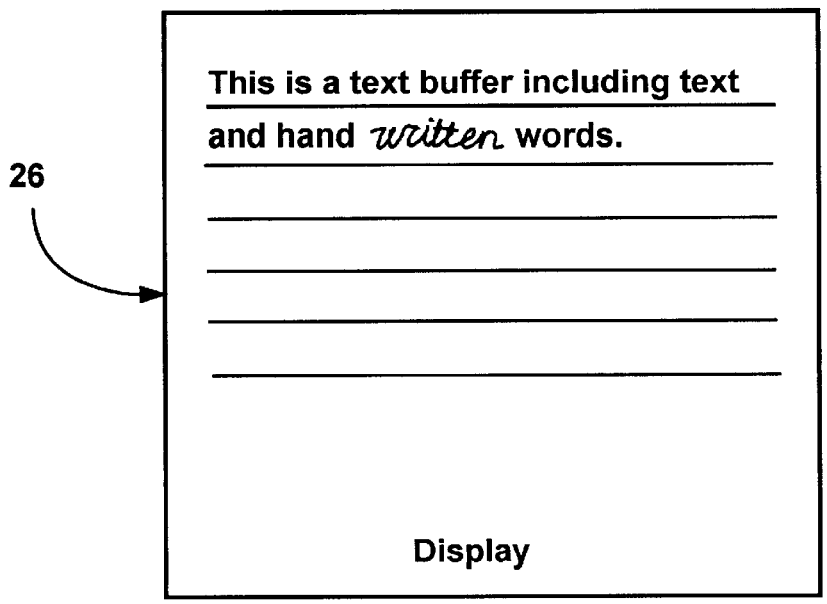
Figure 6:
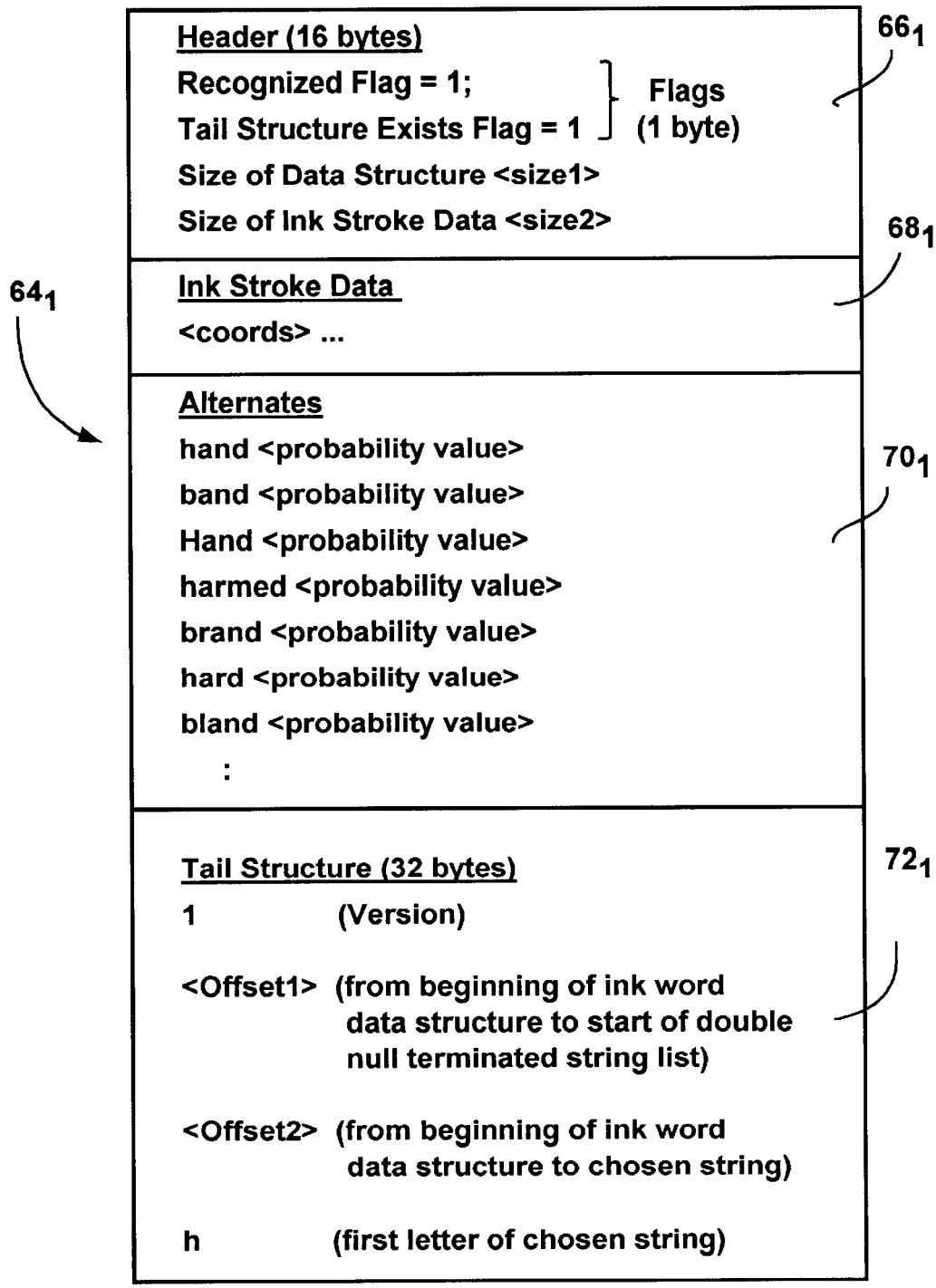
FIG. 6 is a representation of an ink word data structure once the alternates have been returned by a recognizer for an ink word, including a tail structure in accordance with one aspect of the present invention.

FIGS. 4 and 5 shows how this is accomplished by manipulating the text buffer $62_1$, while FIG. 6 shows how the information is added to the ink word data structure $64_1$. As shown in FIG. 4, prior to recognition by the recognizer 58, the ink word is treated as one unitary word (e.g., the handwritten word "hand") for purposes of ink processing. In other words, the user moves the word around as a unit, deletes it as a unit, and cannot insert text in between the letters (although it is feasible to allow such an ink word to be split by the user, such as by converting the single ink word data structure into two ink word data structures each having part of the stroke data of the original ink word data structure therein). However, once the word has been recognized and an alternate has been selected for it, (e.g., the system automatically selects the most probable alternate in response to a user actively requesting recognition such as via a "Tools:Recognize command), the text buffer $62_1$ and data structure $64_1$ are changed as shown in FIGS. 5 and 6, respectively.

In FIG. 5, the text "hand" has been selected as the alternate for the handwritten data ("hand" as written out in FIG. 4). As represented in FIG. 5, upon user selection of "hand" as the selected text word, the letters following the first letter, "and" are inserted into the text buffer $62_1$. The ink word (IW1) remains the same from the perspective of most of the code that deals with the text buffers, for example, the editing code. However, the alternates handling mechanism 76 changes the ink word data structure $64_1$, whereby the ink processor 54 displays the ink word data structure $64_1$ differently so as to produce the correct output for display purposes, i.e., only as a first, single text letter of the word. This enables the editing code to edit the individual characters of the word in the text buffer, without having to modify the code base to enable editing within the ink word data structure. At the same time, the stroke data and alternates information is preserved with what is serving as the first letter of the selected word.

To correctly interpret the ink word data structure, as represented in FIG. 6, the alternates handling mechanism 76 works with flags in the header $66_1$ of the ink word data structure $64_1$, the aforementioned Recognized flag which indicates whether the word has had alternates returned therefor, and a Show Recognized flag (tsShowRecognized) which indicates whether the user has converted the ink to text. Note that the Show Recognized flag is set when the user has converted to text, e.g., via a Recognize command, as generally described in the aforementioned U.S. patent application entitled: "Method and System of Handling the Selection of Alternates for Recognized Words." A Tail Structure Exists (tsTailStructureExists) flag indicates whether the tail structure is present in an ink word data structure. Note that for now, the Tail Structure Exists flag has the same value as the Recognized flag. However, the Tail Structure Exists flag is provided for the future, wherein other information may be stored in the ink word (as described in the tail structure), and it is possible to have a tail structure with no alternates.

The ink processor 54 uses these flags to determine whether it needs to contact the recognizer 58 to obtain alternate information, and also to determine whether to display the ink word as ink or as a text letter. When the word has been recognized by the recognizer, i.e., has had the alternates information 60 returned for it, the alternates and the tail structure are essentially appended to the ink word data structure $64_1$ (actually copied to a copy thereof). If the word is to be displayed as text, (e.g., the ink has been converted to text and the Show Recognized flag equals one), only the first character ("h" in the present example, stored in the tail structure $72_1$) of the word is displayed. As represented in FIG. 5, the succeeding letters of the word ("and" in the present example using the word "hand") are inserted into the text buffer as ordinary text immediately following the ink word.

The tail structure describes the alternate information added to the ink word data structure $64_1$, and also factors in its own data in the total size description. In general, the tail structure comprises a version code (one in the present example), two offsets, and the first letter of the chosen string. The two offsets are zero-based and indicate where in the data structure the alternate information (double null terminated string list) begins, and where in the data structure the chosen string information begins. As can be readily appreciated, it is straightforward to determine where the alternates information begins from these offsets, and because the tail structure size is known (thirty-two bytes in version one) as long as the version number can be located, which can be accomplished by leaving the version number a certain number of bytes from the end. Note that when the alternates/tail structure is copied to a new ink word data structure, the size of the data structure in the header is modified to include this data. The computing of the tail structure and the copying of the information are generally described in the aforementioned U.S. patent application entitled "Method and System for Extending Ink Word Data Structures while Maintaining Version Compatibility."

Note that instead of directly including the alternate information/tail structure in (a copy of) the ink word data structure, the information can be indirectly included, e.g., by storing a pointer to another data structure that includes the alternates information/tail structure. The length of the ink word data structure can be increased, (e.g., by the size in bytes of the pointer), and when the tail structure exists flag is set, the ink processor 54 knows that the pointer is at the end of the ink word data structure. Such a pointer will move with the ink word.

As can be readily understood, it is straightforward to maintain the probability information with the alternates, which are null delimited. For example, each string can have exactly n bytes before or after it after it (but before the zero delimiter) that store the probability data for that string, such as generally represented in FIG. 6. Also, another delimiter could be used to separate probability data from the string data, e.g., the string followed by a null followed by the data followed by a null makes up one string choice, probability data pair. Alternatively, the tail structure could be expanded to separately describe a probability field.

Thus, in the example shown in FIGS. 4–6, once recognized and converted to text, the ink word storing the data for "hand" will be converted to an ink word that when displayed will appear as the letter "h" followed by the text letters "and" in the text buffer. In this manner, the ink data and alternates are preserved with the word, e.g., as the word is moved around during word processing operations. Also, the user can individually edit the characters in the word.

In accordance with one aspect of the present invention, the alternates information, possibly including the probability information, (and possibly other alternate-related data such as number of syllables, number of characters (length) of the alternates and so forth), is used to determine whether an ink word sufficiently matches an entered search word to be considered a match. To this end, as generally represented in FIG. 2, the ink processor 54 includes code that serves as a search mechanism 78, which takes an entered search term (word) 80 and based on search settings 82, evaluates it against the information in the text buffers 62 and ink word data structures 64 to look for matches. As will be understood below, the match need not be exact, but rather can be "fuzzy," in that it may be based on various information present within or derived from the alternates information. For simplicity herein, the ink words in the document for which the search mechanism 78 is searching can be considered as recognized, i.e., they have alternates returned therefor, as either the ink words have already been recognized (whether in foreground or background recognition) or are sent to the recognizer when encountered during a search. Note however that the search can also encounter regular (e.g., typed-in or permanently converted) text during a search, and the present invention can handle searching such regular text.

Moreover, the entered search term 80 can be typed in, in which event it is exactly known, or itself can be handwritten, in which event the entered search term 80 may have alternates returned for it, which can also be used in the search operation (and may be considered part of the search term 80). Wildcards and other properties may be specified by the user when entering the search term 80, but are not described herein for purposes of simplicity. Also, the user may vary the search settings 82, such as to set a level of exactness (e.g., move a slider bar between loose and exact) and/or to select different types of searches that can be carried out. The optional use of the search settings 82 in performing various types of searches is described below. Note that a number of ways of searching for matching ink words are described below, and the user may be able to combine several and adjust sensitivity levels to customize how the search is accomplished. Empirical testing can also determine which tests perform more optimally for a variety of users, for example, to set defaults, eliminate or reduce the impact of some possible tests, and so forth. Further note that the tests may vary based on language and writing styles, e.g., one combination of tests may work very well with English-language cursive words, another with printed words, and still another with Far Eastern languages.

Figure 7:
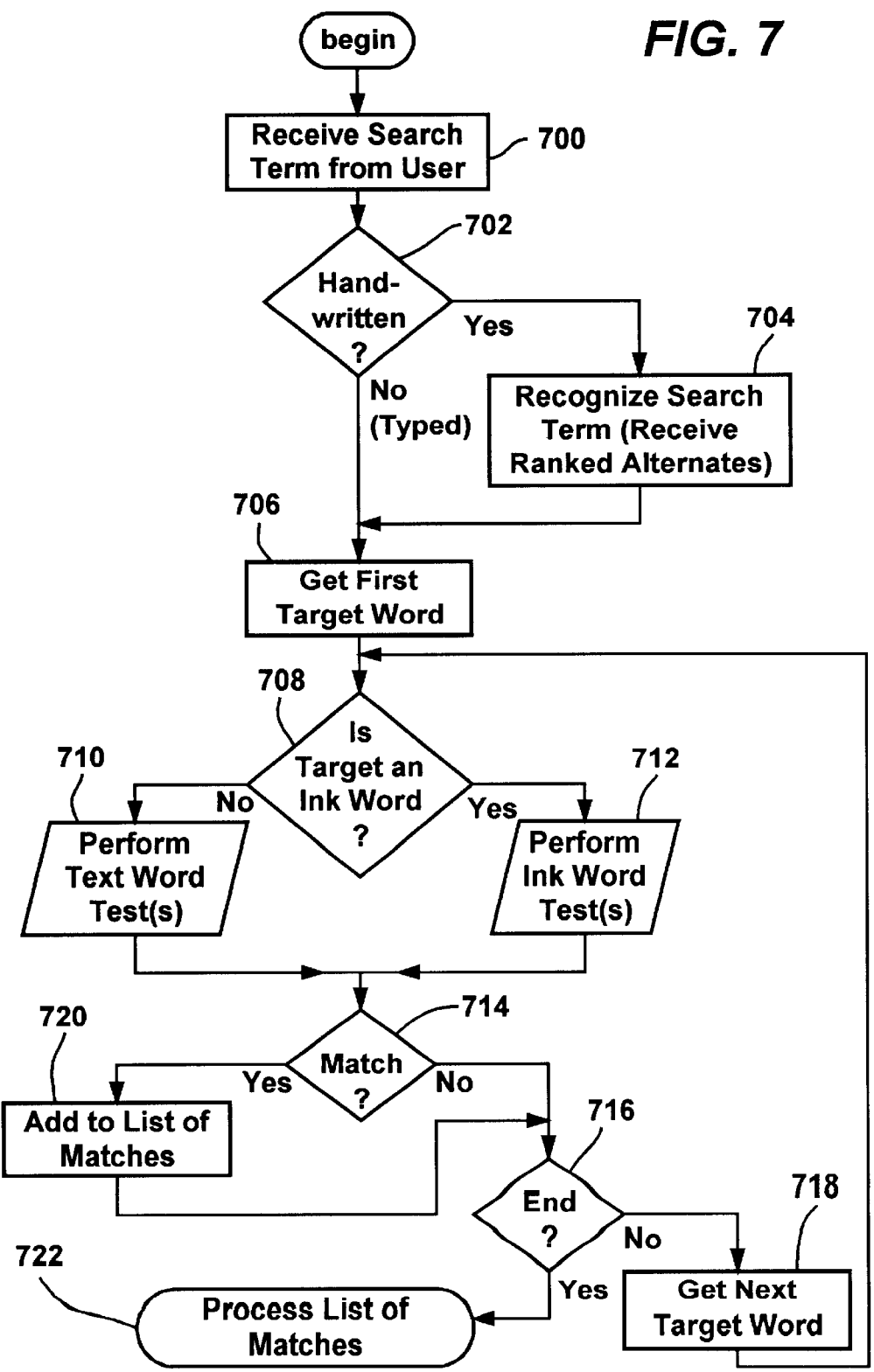
FIG. 7 is a flow diagram generally describing how a document including ink words is searched in accordance with one aspect of the present invention.
Figure 8:
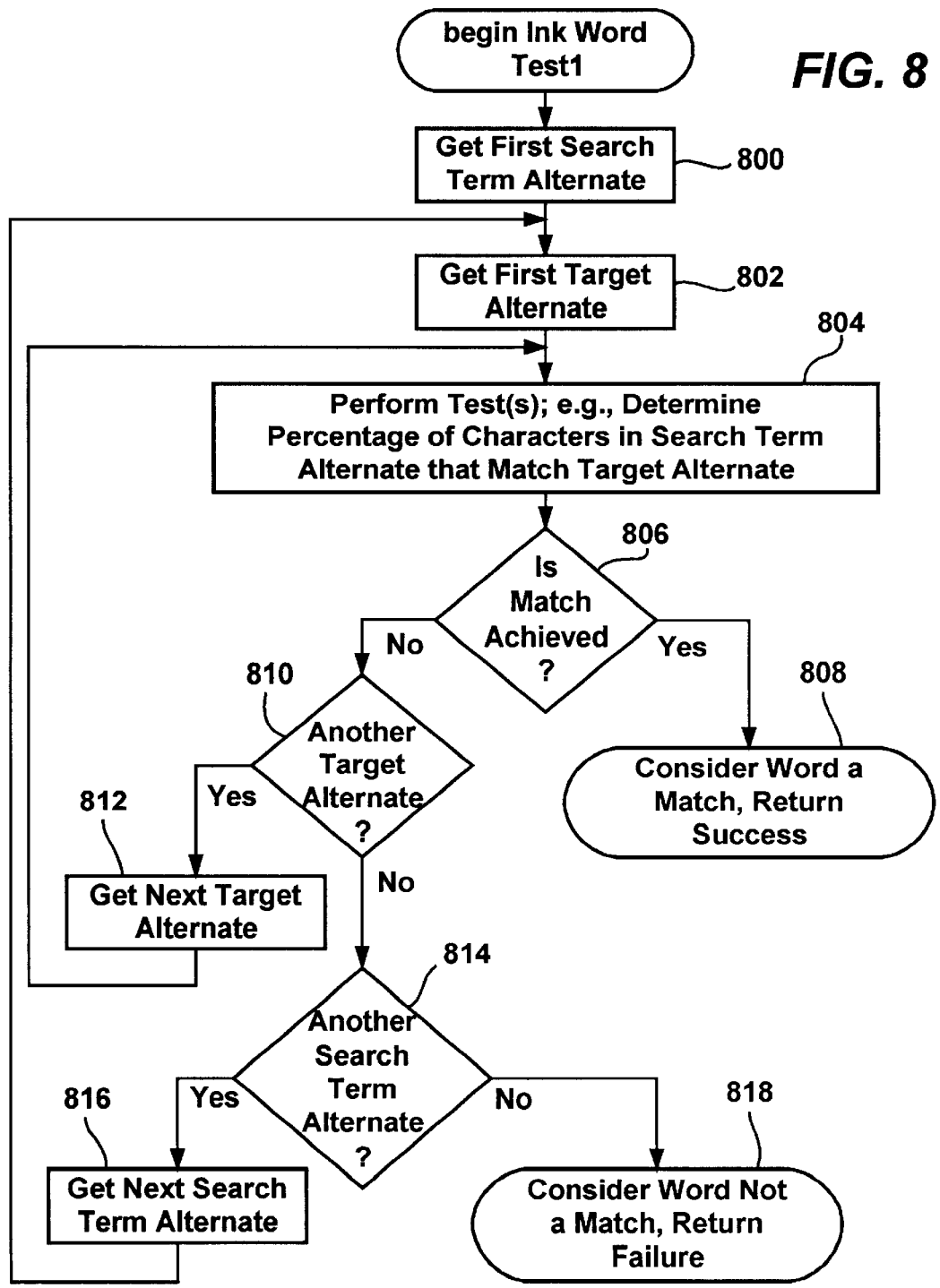
FIG. 8 is a flow diagram generally describing how alternates are used in searching for a match in accordance with one aspect of the present invention.

Turning to a general explanation of the operation of the present invention, FIGS. 7 and 8 describe how the search mechanism 78 of the ink processor 54 searches for matches using one exemplary type of test, shown in FIG. 8 as a test based on a percentage of matching characters. In FIGS. 7 and 8, the search term can be input either as exact text (e.g., typed in) or can be input as handwritten text, whereby the search term is recognized and may have alternates information returned for it. As will be understood, in some of the tests, the search term's alternates information may be used in determining whether each word (or set of alphanumeric characters or the like that does not necessarily comprise a word) in a document matches, i.e., is considered a match according to various criteria. Also, for purposes of simplicity, the search term may be considered as a "search term alternate" or the like even though there may be only one such term, (e.g., no alternates exist for a typed-in term). In addition, each word or set of characters that the search term (alternate) is being compared against will be referred to as the "target word" or "target alternate," even though there may not be any alternates for a given word and the target alternate being evaluated may not actually be a full "word" as understood in conventional usage, but rather some symbol and/or combination of alphanumeric or other characters that may or may not be part of an actual word. The target word may comprise the entire text buffer or buffers to the end of the document, such that multiple-word phrases including spaces between words, paragraph marks, tabs and so forth can also be searched, and a search "string" can contain a combination of both text and handwritten input. However for purposes of simplifying the description herein, a search term can only be either text or a handwritten word, and the target words being examined do not span ink words.

At step 700 of FIG. 7, the search term is received from the user (e.g., via an Edit:Find command or the like) or some other mechanism (e.g., a global find and replace tool). Step 702 represents the evaluation of whether the search term is handwritten or was exactly entered, e.g. typed in. If handwritten, the search term is recognized, (step 704), whereby one or all of the alternates (and other information) returned by the recognizer may be used in the matching operation (test or tests) described below.

Step 706 represents the selection of a target word from the text buffer 62. The target word may be actual (e.g., typed-in) text, or may be an ink word that is either recognized and displayed as text or recognized and displayed as a handwritten entry. If not recognized, the alternates information may be obtained for the target word at this time (not separately shown).

Step 708 determines whether the word in the text buffer is an ink word (IW) or the text of an exact word. Note that any other types of special characters other than ink words (such as indicating a pointer to a graphical image) that may be in the text buffer may be handled otherwise, e.g., ignored or specially tested, however such special characters are not considered herein for purposes of simplicity.

Step 710 represents the test if a target word is text (not an ink word). For example, if both the search term and the target word (e.g., the string of text up to the next ink word) are exactly entered text, then simple string comparison may be performed to look for a match. In this manner, the user will not receive a match for text that is not exactly as specified with other text. Alternatively, (as also represented by step 710), if the target word is not an ink word, but the search term is an ink word with alternates, the search term alternates can be used in the evaluation, in one set of tests (Test Set A), as set forth in the matrix below:

|  | Target Word = Text | Target Word = Ink |
| --- | --- | --- |
| Search Term = Text | String Comparison | Test Set B |
| Search Term = Ink | Test Set A | Test Set C |

Test Set A may be the same as the simple string comparison, e.g., by using only the text of the most-probable alternate, or may be some other test or tests using some or all of the other alternates in addition to the most-probable. One such simple test is to use each of the alternates of the search term in separate exact match tests against the target text string, and considering the word a match if any alternate matches the string. Other tests that may be performed including more "fuzzy" tests are described below, such as those that use only some of the more probable alternates.

Step 712 represents the test or tests that may be performed when the target word is an ink word having alternates, and may, for example, correspond to FIG. 8. In general, if the search term has alternates, both the alternates for the search term and the alternates of the ink word may be used in testing (Test Set B in the above matrix), while if the search term is exact text, then the testing process may be the same (Test Set B but with only one "alternate" for the search term), or a different test or tests may be used (Test Set C). Further, Test Set C may have the same tests but with different (looser or more exact) matching requirements than Test Set B. Some of the various tests that can be performed using alternates are described below with reference to FIG. 8.

Step 714 represents the determination of whether a match was found. If not, step 714 branches to step 716 which tests whether the text buffer (or selected subset thereof) has been fully tested. If not, at step 718 the process advances to the next target word (or string) and the process returns to step 708 to appropriately test this next ink word or text string. If the document or selected part thereof has been fully tested, the user is appropriately prompted at step 722 (e.g., to indicate to the user that the search item was not found, and allow the user to cancel the search or possibly to continue the search from another starting point.

If a match is found at step 714, step 720 is executed to add the match to a match list 90 (FIG. 2), (or alternatively perform some other suitable action, such as to display the found text or ink word to the user and await user instruction). If a match list 90 is first being built, which, for example, can include maintaining information identifying the positions in the text buffer of matched words, the process may continue to look for matches by returning to step 716. Note that step 720 can, for example, also be modified to support a global find and replace (Replace All) or other automatic find-related operation, such as by automatically performing the replace before looping back to step 716, (alternatively any such replace operations may be performed after the set of matches has been built). Step 722 represents processing the list of matches, which may, for example, include revisiting the search hits and asking the user what to do, performing any replace operations, highlighting the matches, and so forth.

FIG. 8 represents how the search term alternates, if more than one, and one or more of the target alternates corresponding to an ink word can be used to perform a fuzzy (i.e., not necessarily exact match) search. In general, as will be understood, the set of search term alternates and target alternates can each be tested against one another until a match is found or no alternates remain. For efficiency, one or both of the sets may be reduced in the number of alternates therein, such as by removing the less-probable words. At present the recognizer returns ten alternates per ink word sent thereto, providing up to one hundred comparisons for a handwritten search term and an ink word. Using some of the various techniques/tests described below, some potential matches can be quickly eliminated, such as by only considering certain of the words based on the number of syllables in the search and target words under test, evaluating the words' relative lengths, by requiring that at least the first characters match, and so forth.

Step 800 of FIG. 8 represents selecting one of the search term alternates, (of which there is at least one in the present example, as a single exact search term is considered to be a single alternate). Step 802 represents getting the first target alternate. Step 804 then performs one or more tests, such as looking for an exact match between the currently selected search term alternate and the currently selected target alternate.

As generally represented at step 804, another test that can be performed (instead of an exact match test) includes determining the percentage of characters in the search term alternate that match the target alternate. The user may be allowed to set a threshold percentage, which when achieved, indicates a match. For example, the user can set a match threshold at eighty percent of character matching required, i.e., at least eighty percent of the characters in the search term alternate need to be in the target alternate. Thus, in this example, the length of the search term alternate is used as a divisor to determine the percentage, e.g., percentage equals number of matching characters divided by the length of the search term alternate. Other percentage of matching formulas may be used, e.g., the number of matching characters divided by the length of the target word alternate, or divided by the length of the longer of the two, the average of the two lengths, and so on. Moreover, although not necessary, by not re-testing a matched letter, multiple appearances of the same letter in a word (the "ee" in "reel") can be treated as distinct letters. For example, "reel" and "real" can be considered as matching three of four individually, not four of four, as the first "e" in "real" matches only the first occurrence of an "e" in "reel," not both.

By way of an example, consider a user entering the word "write" and instructing the search mechanism 78 to search for (e.g., Find) matching words, with a seventy percent match level based on the length of the longest of either the source's or target's current alternate word. If the target word has the word "written" as one of its alternates, a match would be found, as there are five letters (w-r-i-t-e) common to both, and five divided by seven (the length of the longer, target word) exceeds seventy percent. However, if "writing" (instead of written) was the closest (in terms of percentage of characters matched) target alternate, then only four of seven (w-r-i-t) would match, and the seventy percent threshold would not be achieved. Note that with this mechanism, not all of the characters in the target word need to match the search term alternate. For example, in the present invention, not all of the characters of the target alternate (or even the search term alternate/alternate) need be used, and the same number is not a requirement (e.g., a search term alternate of n characters can be compared to up to n+1 characters in the target alternate). Thus, in the above example, "writ" as a search term alternate (or source alternate) will match "writing" as a target alternate, but not vice-versa.

Returning to FIG. 8, step 806 evaluates whether the test (whichever test or combinations of tests is used) indicates a match between the currently selected search term and target alternates. If so, the process ends, returning information indicating a successful match (e.g., to step 714 of FIG. 7). Otherwise, step 806 branches to step 810 where another target alternate, if any, is selected at step 812. Steps 810 and 812 thus walk through the list of target alternates for each search term, (although as can be readily appreciated, it is essentially equivalent to walk through the list of search term alternates for each selected target alternate).

When each of the target alternates have been evaluated, but still no match found at step 806, steps 814 and 816 are executed to select the next search term alternate, if any, to test against each of the target alternates as described above. If no more search term alternates are available, i.e., each search term alternate was evaluated against each target alternate but no match was achieved, step 814 branches to step 818 where a failure is returned (e.g., to step 714 of FIG. 7) for this word. As described above, the next word in the document, if any, is tested in the same manner.

A number of ways to make the testing process more efficient and/or more optimal for a given user or scenario are described below. For example, regardless of the comparison scheme or schemes used, not all of the characters in the alternates being compared need be treated the same, but instead certain characters may be weighted differently. For example, in the above percentage of matching characters, if the first character matches, an extra percentage amount can be added to the actual percentage determined, thereby considering some words that would otherwise fall short as matching because their first characters were the same. As can be readily appreciated, this weighting can be performed many other ways. For example, for a six-character word, a match of the first character can be considered worth fifty percent, with ten percent for each other character. Words of other lengths can have other weighted formulas, although in general, because the recognizer has a tendency to get the first character correct, the first character may be generally assigned more weight.

In addition to the above tests, the lengths (number of characters) of the words may factor into the formula or formulas used, e.g., a search term alternate needs to be less than the length of the target alternate plus three, else the word will not be considered a match. Other criteria can be used in the evaluation. For example, the number of syllables of the words (which a recognizer can return) can be used to determine a match, e.g., it can be a requirement that the search term alternate and target alternate have to be within one syllable of one another, such as before even attempting the percentage test, (or as a separate test). For example, with such a "within n-syllable" (or syllables) test, if n is set as less than or equal to one, a search term alternate such as "probable" (three syllables) would be further compared against "probably" (three syllables), but would not be tested against the alternate word "probability" (five syllables). Again, the search term alternates may have different syllable-based rules than the target alternates, e.g., "rob" as a search term alternate may be compared with "probable," "probably" and "probability," but if "rob" was the target, it would be skipped over. Note that as used herein, the search term alternate or alternate need not be an actual word, but can be a fragment of a word or even a single character (including numbers or other symbols), e.g., "prob" can be searched.

Still other tests can be performed instead of or in addition to the above-described tests. For example, the first (most-probable) search term alternate may have to exactly match one of the alternates in the set corresponding to the target ink word, otherwise the words can be considered as not matching. Conversely, if the source has alternates, the first target alternate may have to exactly match one of the source alternates. A still "looser" exact match test would be the above-described exact match of any of the source alternates with any of the target alternates. Note that FIG. 8 inherently handles the preciseness of a "typed-in" search term alternate, as such a word would have only one "source alternate," i.e., the word itself, however as also described above, the test or tests of step 804 can be changed when typed-in search terms are in use.

Moreover, because words returned by a recognizer may be ranked according to a probability, and/or because the probability information may be maintained with the word as described in the aforementioned U.S. patent application entitled "Method and System for Maintaining Alternates in Association with Recognized Words," the alternates can be weighted differently. For example, as listed alternates become less probable, the exactness of the match (e.g., percentage of matching characters) that is considered necessary to have a match may be varied, e.g., increased. A Bayesian (e.g., double the probability, double the weight) or other statistical method may be used.

Still other tests may be used instead of, or to supplement, the above-described tests. For example, instead of requiring that any one search term alternate match any one target alternate, a percentage (or other count) of alternate to alternate matches may be required. In such an instance, step 806 of FIG. 8 is not considered satisfied unless and until this percentage or count is achieved. For example, if ten search term alternates are compared against ten target alternates and forty percent is the matching threshold, step 806 looks for (e.g., by counting for) forty matches out of the one-hundred possible combinations. Note that each alternate-to-alternate match can be determined by any of the above-described tests, e.g., exact or percentage of characters-based, possibly with differently characters weighted and so forth, and including factors such as relative length, number of syllables and/or probability information.

Also, for ink words, image matching can be used to supplement the above-described testing operation. For example, the ink data (such as stored as coordinates, as a bitmap, as features or the like) can be used to help determine whether a given search term (itself handwritten or typed-in and matched to ink of some other target word) matches a target ink word. In other words, what would otherwise be a match according to the above-described alternate matching test or tests may be eliminated (before or after the alternate testing) if the search and target words' ink data are sufficiently different, while what would otherwise not be a match may be considered a match if the ink words' data are sufficiently similar. Image matching that can supplement the use of alternates in searching for matching ink words is described in U.S. Pat. No. 5,687,254, hereby incorporated by reference.

Lastly, the above-described tests are only some of the ways in which alternates information for handwritten ink data may be used in searching. As can be appreciated, other tests and/or techniques may be substituted or used to supplement the described techniques without departing from the spirit and scope of the present invention.

As can be seen from the foregoing detailed description, there is provided a method and system that enables ink and other words to be searched in a document while overcoming the problems of the prior art. The method and system are flexible and may be varied and/or otherwise customized to meet a variety of scenarios.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method comprising:
    receiving search data representing a word to find;
    receiving a request to find an instance of that word in a set of words, at least some of the words in the set having been recognized from handwritten input and having a set of alternates associated therewith; and
    comparing the search data with alternates of a given word in the set, including using probability information accompanying the alternates, to determine if a sufficient matching level is achieved to consider the given word an instance of the word to find, and if so, returning information indicative of a successful match.

2. The method of claim 1 wherein receiving search data representing a word to find includes receiving handwritten ink data, and receiving recognized text based on the handwritten ink data.

3. The method of claim 2 further comprising receiving alternates based on the handwritten ink data.

4. The method of claim 3 comparing the search data with the alternates of a given word in the set include comparing a plurality of search alternates against a plurality of the alternates of the given word in the set.

5. The method of claim 1 wherein comparing the search data with the alternates of a given word in the set further includes determining a percentage of characters that match.

6. The method of claim 1 wherein comparing the search data with the alternates of a given word in the set further includes searching for at least one exact match.

7. The method of claim 6 wherein comparing the search data with the alternates of a given word in the set further includes determining a percentage of exact matches.

8. The method of claim 1 wherein comparing the search data with the alternates of a given word in the set further includes evaluating the lengths of at least some of the alternates.

9. The method of claim 1 wherein comparing the search data with the alternates of a given word in the set further includes evaluating the number of syllables of at least some of the alternates.

10. The method of claim 1 wherein comparing the search data with the alternates of a given word in the set further includes requiring an exact match of a first character of the search data with a character in at least one of the alternates.

11. The method of claim 1 wherein information indicative of a successful match is returned, and further comprising adding information corresponding to a match to a match list.

12. The method of claim 1 wherein comparing the search data includes evaluating search settings.

13. In a computing device, a system comprising:
a memory configured to maintain search term data comprising at least one word representing a search term to find; and
a search mechanism configured to search a buffer for data corresponding to the search term, at least one set of data in the buffer corresponding to ink data having a plurality of alternates information including a plurality of words recognized from handwritten input, wherein the search mechanism compares the search term data with at least some of the alternates information to determine if a sufficient matching level is achieved by looking for at least one exact match between the at least one word of the search term data and at least one of the plurality of words of the alternates information, including determining a value indicative of a number of exact matches.

14. The system of claim 13 further comprising an input mechanism configured to receive the search term data.

15. The system of claim 14 wherein the input mechanism receives the search term data in the form of handwritten ink data, and requests recognition from a recognizer.

16. The system of claim 13 wherein each set of data in the buffer that corresponds to ink data identifies an ink word data structure.

17. The system of claim 13 wherein the search term data includes search term alternates.

18. The system of claim 17 wherein the search mechanism determines if a sufficient matching level is achieved by comparing the search alternates with the alternates information.

19. The system of claim 13 wherein the search mechanism determines if a sufficient matching level is achieved by evaluating characters of the search term data against characters of the alternates information.

20. The system of claim 19 wherein at least one character is differently weighted with respect to at least one other character.

21. The system of claim 13 wherein the value comprises a count.

22. The system of claim 13 wherein the value comprises a percentage.

23. The system of claim 13 wherein the search mechanism is further configured to use probability information accompanying the alternates information to determine if a sufficient matching level is achieved.

24. The system of claim 13 wherein the alternates information includes alternates in the form of words, and wherein the search mechanism is further configured to evaluate the lengths of at least some of the words to determine if a sufficient matching level is achieved.

25. The system of claim 13 wherein the alternates information includes alternates in the form of words, and wherein the search mechanism is further configured to evaluate the number of syllables of at least some of the words.

26. The system of claim 13 wherein the search mechanism adds information to a match list when a sufficient matching level is achieved.

27. The system of claim 13 wherein the search mechanism determines when a sufficient matching level is achieved based on information maintained in search settings.

28. A computer-readable medium having computer-executable instructions, which when executed perform a method comprising:
maintaining alternates information in association with handwritten input;
receiving search data; and
evaluating the search data against the alternates information to determine if a sufficient matching level is achieved, including evaluating search settings comprising a threshold match level, and if a sufficient matching level is achieved, returning information indicative of a successful match.

29. The computer-readable medium having computer-executable instructions of claim 28 wherein the threshold match level is user-adjustable.

30. The computer-readable medium having computer-executable instructions of claim 28 wherein evaluating the search data against the alternates information includes comparing individual characters in the search data against individual characters in the alternates information.

31. A computer-readable medium having computer-executable instructions which when executed perform the method of claim 1.

32. In a computer system, a method comprising:
receiving search data representing a word to find;
receiving a request to find an instance of that word in a set of words, at least some of the words in the set having been recognized from handwritten input and having a set of alternates associated therewith; and
comparing the search data with alternates of a given word in the set, including determining a percentage of characters that match, to determine if a sufficient matching level is achieved to consider the given word an instance of the word to find, and if so, returning information indicative of a successful match.

33. The method of claim 32 wherein receiving search data representing a word to find includes receiving recognized text based on handwritten ink data.

34. The method of claim 33 further comprising receiving alternates based on the handwritten ink data.

35. The method of claim 34 wherein comparing the search data includes comparing a plurality of search alternates against a plurality of the alternates of the given word in the set.

36. A computer-readable medium having computer-executable instructions which when executed perform the method of claim 32.

37. In a computer system, a method comprising:

receiving search data representing a word to find;

receiving a request to find an instance of that word in a set of words, at least some of the words in the set having been recognized from handwritten input and having a set of alternates associated therewith; and comparing the search data with alternates of a given word in the set, including evaluating the lengths of at least some of the alternates, to determine if a sufficient matching level is achieved to consider the given word an instance of the word to find, and if so, returning information indicative of a successful match.

38. The method of claim 37 wherein receiving search data representing a word to find includes receiving recognized text based on handwritten ink data.

39. The method of claim 37 wherein comparing the search data further includes evaluating the number of syllables of at least some of the alternates.

40. The method of claim 37 wherein comparing the search data further includes looking for an exact match of a first character of the search data with at least one of the alternates.

41. A computer-readable medium having computer-executable instructions which when executed perform the method of claim 37.

42. In a computer system, a method comprising:

receiving search data representing a word to find;

receiving a request to find an instance of that word in a set of words, at least some of the words in the set having been recognized from handwritten input and having a set of alternates associated therewith; and comparing the search data with alternates of a given word in the set, including evaluating the number of syllables of at least some of the alternates, to determine if a sufficient matching level is achieved to consider the given word an instance of the word to find, and if so, returning information indicative of a successful match.

43. The method of claim 42 wherein comparing the search data further includes determining a matching value.

44. A computer-readable medium having computer-executable instructions which when executed perform the method of claim 42.

45. In a computing device, a system comprising:

a memory configured to maintain search term data representing a search term to find; and a search mechanism configured to search a buffer for data corresponding to the search term, at least one set of data in the buffer corresponding to ink data having a plurality of alternates information recognized from handwritten input, wherein the search mechanism compares the search term data with at least some of the alternates information to determine if a sufficient matching level is achieved by evaluating characters of the search term data against characters of the alternates information, wherein at least one character is differently weighted with respect to at least one other character.

46. The system of claim 45 wherein the search term data includes search term alternates.

47. The system of claim 45 wherein the search term data comprises at least one word, and wherein the alternates information includes a plurality of words.

48. The system of claim 45 wherein the search mechanism is configured to use probability information accompanying the alternates information to determine if a sufficient matching level is achieved.

\* \* \* \* \*

UNITED STATES PATENT AND TRADEMARK OFFICE
CERTIFICATE OF CORRECTION

PATENT NO.         : 6,785,417 B1                                                      Page 1 of 1
APPLICATION NO.    : 09/643617
DATED              : August 31, 2004
INVENTOR(S)        : Peter Williamson It is certified that error appears in the above-identified patent and that said Letters Patent is hereby corrected as shown below:

On Title page, Item (73) should be, Insert -- Microsoft Corporation, Redmond, WA (Assignee)   (US) --.

Signed and Sealed this

Seventeenth Day of April, 2007

JON W. DUDAS
*Director of the United States Patent and Trademark Office*